Patented Apr. 6, 1937

2,075,888

UNITED STATES PATENT OFFICE 2,075,888

PRODUCTION OF ARTIFICIAL FILAMENTS, THREADS, RIBBONS OR THE LIKE BY THE DRY SPINNING METHOD

Henry Dreyfus, London, England

No Drawing. Application March 13, 1931, Serial No. 522,530. In Great Britain May 6, 1930

14 Claims. (Cl. 18—54)

This invention is a continuation in part of U. S. application S. Nos. 328,305 filed 24th December, 1928 and 444,621 filed 15th April, 1930 and relates to the manufacture of artificial filaments, threads, ribbons, films or other products from solutions containing cellulose acetate or other cellulose esters or ethers by the dry spinning method.

U. S. application S. No. 328,305 filed 24th December, 1928 describes the production of improved artificial filaments, threads or like products by the dry spinning of solutions containing cellulose esters or ethers in a solvent medium containing a volatile substance or substances, a non-solvent liquid or liquids of higher boiling point than the volatile substance or substances and a solvent or solvents of higher boiling point than the non-solvent liquid or liquids, the higher boiling solvent or solvents being preferably employed in a total quantity not exceeding 30% of the weight of the cellulose ester or ether. By this means it was found possible to obtain products of substantially increased extensibility or elasticity, and in particular low filament deniers are obtainable.

U. S. application S. No. 444,621 filed 15th April, 1930 describes the production of products by dry spinning solutions of cellulose esters or ethers in a mixture comprising a volatile non-solvent medium (which comprises a volatile solvent and a higher boiling non-solvent) and a higher boiling solvent or solvents in sufficient quantity to confer solvent properties upon the medium.

The said specifications instance a large number of volatile substances, non-solvent liquids and higher boiling solvents. For example water and methyl, ethyl and propyl alcohol are instanced as examples of non-solvent liquids while diacetone alcohol is instanced as an example of a higher boiling solvent. The present invention relates to certain specific solvent mixtures which I have found especially suitable for the manufacture of these products of increased extensibility or elasticity and for the manufacture of low filament deniers. I have found that it is especially advantageous to employ in conjunction with a volatile substance, for example acetone, a non-solvent liquid and diacetone alcohol, ethyl lactate, lactic acid, dioxane, di-ethyl tartrate or di-ethyl phthalate or other high boiling solvents, the proportion of non-solvent liquid to higher boiling solvent being between 3:1 and 1:3, and preferably between 2:1 and 1:2. The non-solvent liquid is preferably a substance containing one or more hydroxy groups, for example water or methyl, ethyl or propyl alcohol. Thus for instance I may use water in conjunction with diacetone alcohol in equal proportions or in a proportion of 4 parts of water to 5 parts of diacetone alcohol or even in a proportion of 3 parts of water to 5 parts of diacetone alcohol, and similar proportions may be used in the case of diethyl phthalate and other higher boiling solvents and again the water may be wholly or in part replaced by an alcohol.

The total quantity of non-solvent liquid in the solvent mixture preferably does not exceed 12% and may be of the order of 6 to 8%. For instance a very suitable solvent mixture for spinning low filament deniers according to the present invention may consist of 80 to 84 parts of acetone, 9 to 7 parts of water and 11 to 9 parts of diacetone alcohol, ethyl lactate or diethyl phthalate.

For further details of the methods of procedure reference is made to U. S. application S. No. 328,305 filed 24th December, 1928. The temperature and rate of flow of the air or other evaporative medium may be adjusted to obtain any desired type or form of filament (solid, hollow etc.) or cross-section of filament. The size of the jet holes may be adjusted in accordance with the spinning requirements. For example, when running at relatively high spinning speeds, smaller jet holes, e. g. of .08 to .05 mm. or even down to .01 mm. diameter, may be used than with moderate or low spinning speeds. Again, with the higher speeds, higher concentrations of solvent vapour in the evaporative medium are permissible than with lower speeds of spinning to obtain products having similar physical characteristics, thus with the higher spinning speeds one may employ a smaller flow of evaporative medium. Furthermore these factors or other conditions may be varied in accordance with the denier being produced.

The invention includes processes in which the volatile constituents of the solvent mixture are substantially eliminated from the filaments or other products in one operation, the spinning process being carried out with a suitable tension applied direct from the nozzles. The products which still contain higher boiling solvent may be further drawn out, as for example between two rollers or other devices rotating at different peripheral speeds. Such additional tension or stretch may be imparted to the filaments or other products before the complete elimination of the volatile constituents of the solvent mixture. For instance the filaments or other products may be subjected to a dry spinning operation to eliminate a substantial proportion of the volatile constituents of the solvent mixture, the said operation being conducted under tension or not as desired, and the filaments or other products, still in a plastic state due to their content of higher boiling solvents and lower boiling constituents, may be stretched or further stretched as previously described.

The invention is particularly valuable in the case of obtaining products from solutions of cellulose acetate and especially acetone-soluble cellulose acetate but may also be applied to the manufacture of products from solutions of other cellulose esters, for example cellulose formate, propionate or butyrate or of cellulose ethers for instance methyl, ethyl or benzyl cellulose or other cellulose ethers.

What I claim and desire to secure by Letters Patent is:—

1. In a process for the manufacture of artificial filaments, threads and like materials of increased extensibility and low filament denier by extruding a solution of a cellulose derivative into an evaporative atmosphere, the step of forming said solution by dissolving said cellulose derivative in a solvent medium comprising a volatile solvent, 6 to 12% by weight of a non-solvent liquid of higher boiling point than the said volatile solvent and a solvent of higher boiling point than said non-solvent liquid, the proportion of non-solvent liquid to solvent of higher boiling point in the solvent medium being between 3:1 and 1:3 by weight.

2. In a process for the manufacture of artificial filaments, threads and like materials of increased extensibility and low filament denier by extruding a solution of cellulose acetate into an evaporative atmosphere, the step of forming said solution by dissolving said cellulose acetate in a solvent medium comprising a volatile solvent, 6 to 12% by weight of a non-solvent liquid of higher boiling point than the said volatile solvent and a solvent of higher boiling point than said non-solvent liquid, the proportion of non-solvent liquid to solvent of higher boiling point in the solvent medium being between 3:1 and 1:3 by weight.

3. In a process for the manufacture of artificial filaments, threads and like materials of increased extensibility and low filament denier by extruding a solution of a cellulose derivative into an evaporative atmosphere, the step of forming said solution by dissolving said cellulose derivative in a solvent medium comprising a volatile solvent, 6 to 12% by weight of a non-solvent liquid of higher boiling point than the said volatile solvent and a solvent of higher boiling point than said non-solvent liquid, the proportion of non-solvent liquid to solvent of higher boiling point in the solvent medium being between 2:1 and 1:2 by weight.

4. Process according to claim 2, wherein the amount of higher boiling point solvent present in the solution does not exceed 30% by weight of that of cellulose acetate present.

5. Process according to claim 2, wherein the higher boiling point solvent is one selected from the group consisting of diacetone alcohol, ethyl lactate and diethyl phthalate.

6. A spinning solution for the production of artificial filaments, threads and like materials of increased extensibility and low filament denier by dry spinning processes, comprising a cellulose derivative dissolved in a solvent medium comprising a volatile solvent, 6 to 12% by weight of a non-solvent liquid of higher boiling point than the said volatile solvent and a solvent of higher boiling point than said non-solvent liquid, the proportion of non-solvent liquid to solvent of higher boiling point in the solvent medium being between 3:1 and 1:3 by weight.

7. A spinning solution for the production of artificial filaments, threads and like materials of increased extensibility and low filament denier by dry spinning processes, comprising cellulose acetate dissolved in a solvent medium comprising a volatile solvent, 6 to 12% by weight of a non-solvent liquid of higher boiling point than the said volatile solvent and a solvent of higher boiling point than said non-solvent liquid, the proportion of non-solvent liquid to solvent of higher boiling point in the solvent medium being between 3:1 and 1:3 by weight.

8. Process for the production of artificial filaments, threads and like materials of increased extensibility and low filament denier, which comprises forming a solution of a derivative of cellulose in a solvent medium comprising a volatile solvent, a solvent of a higher boiling point than said volatile solvent, and 6 to 12%, based on the weight of the solvent medium, of a non-solvent liquid with a boiling point between the boiling points of the said solvents, the proportion of non-solvent liquid to solvent of a higher boiling point in the solvent medium being between 3:1 and 1:3 by weight, and extruding said solution into an evaporative atmosphere.

9. Process for the production of artificial filaments, threads and like materials of increased extensibility and low filament denier, which comprises forming a solution of cellulose acetate in a solvent medium comprising a volatile solvent, a solvent of a higher boiling point than said volatile solvent, and 6 to 12%, based on the weight of the solvent medium, of a non-solvent liquid with a boiling point between the boiling points of the said solvents, the proportion of non-solvent liquid to solvent of a higher boiling point in the solvent medium being between 2:1 and 1:2 by weight, and extruding said solution into an evaporative atmosphere.

10. Process for the production of artificial filaments, threads and like materials of increased extensibility and low filament denier, which comprises forming a solution of acetone-soluble cellulose acetate in a solvent medium comprising a volatile solvent, 6 to 12% by weight of a non-solvent liquid consisting of a hydroxy body of a higher boiling point than said volatile solvent, and a solvent of a higher boiling point than said non-solvent liquid, the proportion of non-solvent liquid to solvent of a higher boiling point in the solvent medium being between 2:1 and 1:2 by weight, and extruding said solution into an evaporative atmosphere.

11. Process for the production of artificial filaments, threads and like materials of increased extensibility and low filament denier, which comprises forming a solution of acetone-soluble cellulose acetate in a solvent medium comprising a volatile solvent, 6 to 12% by weight of alcohol, and a solvent of a higher boiling point than alcohol, the proportion of alcohol to solvent of a higher boiling point being between 2:1 and 1:2 by weight, and extruding said solution into an evaporative atmosphere.

12. Process for the production of artificial filaments, threads and like materials of increased extensibility and low filament denier, which comprises forming a solution of acetone-soluble cellulose acetate in a solvent medium comprising a volatile solvent, 6 to 12% by weight of water, and a solvent of a higher boiling point than water, the proportion of water to solvent of a higher boiling point being between 2:1 and 1:2 by weight, and extruding said solution into an evaporative atmosphere.

13. Process for the production of artificial filaments, threads and like materials of increased extensibility and low filament denier, which comprises forming a solution of cellulose acetate in a solvent medium consisting of 80 to 84 parts by weight of acetone, 9 to 7 parts by weight of water and 11 to 9 parts by weight of a solvent selected from the group consisting of diacetone alcohol, ethyl lactate and diethyl phthalate, and extruding said solution into an evaporative atmosphere.

14. Process for the production of artificial filaments, threads and like materials of increased extensibility and low filament denier, which comprises forming a solution of cellulose acetate in a solvent medium comprising a volatile solvent, 6 to 12% by weight of an organic non-solvent liquid of higher boiling point than said volatile solvent, and a solvent of higher boiling point than said organic non-solvent liquid, the proportion of non-solvent liquid to solvent of higher boiling point in the solvent medium being between 3:1 and 1:3 by weight, and extruding said solution into an evaporative atmosphere.

HENRY DREYFUS.